United States Patent
Ono et al.

(10) Patent No.: US 7,872,998 B2
(45) Date of Patent: Jan. 18, 2011

(54) MOBILE COMMUNICATION SYSTEM AND APPARATUS USED FOR SAME, AND CONTROL PROGRAM

(75) Inventors: Masahiro Ono, Tokyo (JP); Tsuneo Nakata, Tokyo (JP); Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 1276 days.

(21) Appl. No.: 10/573,189

(22) PCT Filed: Sep. 15, 2004

(86) PCT No.: PCT/JP2004/013466

§ 371 (c)(1), (2), (4) Date: Mar. 22, 2006

(87) PCT Pub. No.: WO2005/034448

PCT Pub. Date: Apr. 14, 2005

(65) Prior Publication Data

US 2007/0036115 A1    Feb. 15, 2007

(30) Foreign Application Priority Data

Sep. 22, 2003    (JP) ............................... 2003-329745

(51) Int. Cl.
*H04W 4/00* (2009.01)
(52) U.S. Cl. .................... 370/328; 370/338; 455/11.1
(58) Field of Classification Search .................. 370/328, 370/338; 455/11
See application file for complete search history.

(56) References Cited

U.S. PATENT DOCUMENTS 7,054,636 B1 *    5/2006    Howe .......................... 455/445

2001/0046223 A1 *    11/2001    Malki et al. ................. 370/338

FOREIGN PATENT DOCUMENTS

| JP | 2002-124955 | 4/2002 |
| JP | 2003-68683 | 3/2003 |
| JP | 2004-80642 | 3/2004 |
| JP | 2004-120322 | 4/2004 |

OTHER PUBLICATIONS

Internet-Draft, "Mobile Networks Support in Mobile IPv6"; 20, Mar. 2002.
Manabu Isomura et al., "Proposal of Routing Mechanism for Mobile Router to Achieve Network Mobility", IEICE, May 17, 2002.

* cited by examiner

*Primary Examiner*—Charles Shedrick
(74) *Attorney, Agent, or Firm*—Scully, Scott, Murphy & Presser, P.C.

(57) ABSTRACT

An object of the present invention is to provide technology in which an HA is capable of efficiently maintaining registration information of an MR, and communication efficiency in registration/update processing between the HA and the MR is improved.

A mobile node has a representative home address, a subsidiary home address, and a care-of address, and registers information (joint information) showing the relation between the representative home address, and all subsidiary home addresses, and the care-of address with the home agent, each time the mobile node moves to other network and is assigned a new care-of address. The home agent receives a registration request for the joint information, and stores the registered information, and if a packet destined for the representative home address, or any subsidiary home address arrives from any correspondent node, retrieves the joint information including the address from the registered information maintained thereby, and transfers the packet to the corresponding care-of address.

9 Claims, 6 Drawing Sheets

| | Global Address | MAC Address |
|---|---|---|
| MNN-1 | C.0.0.1 | XX:XX:XX:XX:XX:XX |
| MNN-2 | C.0.0.2 | YY:YY:YY:YY:YY:YY |

FIG. 6

| MR | CoA | HoA | Subnet Mask | Additional Address |
|---|---|---|---|---|
| MR-1 | A.0.0.1 | B.0.0.1 | 255.255.255.0 | C.0.0.1<br>C.0.0.2 |
| MR-2 | A.0.0.2<br>A.0.0.3 | B.0.1.1 | - | C.0.0.3 |
| --- | --- | --- | --- | --- |
| MR-n | D.0.0.1 | B.0.n.1 | 255.255.255.0 | - |

MOBILE COMMUNICATION SYSTEM AND APPARATUS USED FOR SAME, AND CONTROL PROGRAM

TECHNICAL FIELD TO WHICH THE INVENTION PERTAINS

The present invention relates to communication using a mobile network, and in particular to a global address assignment technology.

BACKGROUND ART

When mobility in a network is performed during communication using an IP, a Mobile IP is available as technology for continuing the communication without having to change an IP address (refer to Non-Patent Literature 1).

Non-Patent Literature 1
"IP Mobility Support for IPv4," RFC3344, August, 2002.

An MN (Mobile Node) notifies an HA (Home Agent) which is present in the home network of the MN of an address acquired during a network connection as a CoA (Care-of-Address). The HA is allowed to communicate by receiving and transferring a packet destined for the MN by proxy, while the MN is allowed to communicate by using an HoA (Home Address) used when the MN is present in the home network.

Furthermore, where the MN functions as a router of a local network, the MN operates as follows.

When a communication terminal MNN (Mobile Network Node) is connected to a network under the control of the MN, the MNN acquires an address managed by the MN through DHSP, PPP, and the like. The MN notifies the HA of an address assigned thereby, while the HA registers so as to transfer a packet destined for the assigned address as well.

DISCLOSURE OF THE INVENTION

Problems to be Solved by the Invention

However, prior art has a problem that where an MN registers a plurality of addresses with an HA as an HoA, the HA has to have registration information more than necessary, resulting in inefficiency.

In addition, the prior art has a problem that it is necessary to independently perform registration/update processing between the HA and the MN for each HoA, thus resulting in inefficiency.

Hence, the present invention is invented in the light of the aforementioned problems, and an object thereof is to provide a mobile communication system, apparatus used for the same, and a control program which allow the HA to efficiently maintain registration information of an MR, and which improve communication efficiency in the registration/update processing between the HA and an MR.

Means for Solving the Problems

A first invention for achieving the aforementioned object is a mobile communication system composed of a home agent, a mobile node, and one or more correspondent nodes, wherein said mobile node comprises means for storing a preassigned representative home address, 0 or more preassigned subsidiary home addresses, and a care-of address temporarily assigned in a network in which the mobile node is currently present; and means for making a registration request for joint information which relates the representative home address to all subsidiary home addresses, and the care-of address to said home agent, each time the mobile node moves to other network, and is assigned a new care-of address, and wherein said home agent comprises means for receiving the registration request for said joint information, and if a packet destined for the representative address or any secondary address arrives from any correspondent node, retrieving the joint information including the representative home address or the subsidiary home address, from a table in which the joint information is registered, and transferring the packet to the care-of address corresponding to the address for which the packet is destined.

A second invention for achieving the aforementioned object, in the aforementioned first invention, wherein said mobile node comprises means for registering a part of the subsidiary home addresses owned by said mobile node at the time of processing of the registration of said joint information, and managing the remaining as unregistered subsidiary home addresses;

means for requesting additional registration of the unregistered subsidiary home addresses to the home agent at a given point in time; and means for requesting deregistration of the registered subsidiary home addresses to the home agent, and wherein, if additional registration of a subsidiary home address is requested from the mobile node, said home agent comprises means for adding the address to the corresponding joint information of the mobile node; and if the deregistration of the subsidiary home address is requested, means for erasing the address from the corresponding joint information of the mobile node, whereby the number of the subsidiary home addresses which will be used, out of the subsidiary home addresses owned by said mobile node may be dynamically changed.

A third invention for achieving the aforementioned object, in the aforementioned first and second inventions, wherein said mobile node comprises means for requesting an assignment of a new subsidiary home address to the home agent; and means for returning the assigned subsidiary home address, and wherein, if the assignment of the new subsidiary home address is requested from the mobile node, said home agent comprises means for selecting arbitrary address from an unassigned address group owned by the home agent to register this address with the joint information of the mobile node, and notifying the mobile node of it; and if the assigned subsidiary home address is returned from the mobile node, means for returning this to the unassigned addresses, and erasing this from the joint information of the mobile node, whereby the number of the subsidiary home addresses owned by the mobile node may be dynamically changed.

A fourth invention for achieving the aforementioned object, in the aforementioned first to third inventions, a plurality of mobile network nodes being located under said mobile node, these constituting a local network with said mobile node as a router, wherein said mobile node comprises means for assigning the subsidiary home addresses to the mobile network nodes, and if a packet destined for the subsidiary home address assigned to the mobile network nodes arrives, transferring this to the corresponding mobile network node, whereby said mobile node performs location registration for the mobile network nodes in the local network managed by said mobile node by proxy, and transfers the packet destined for the mobile network node.

A fifth invention for achieving the aforementioned object, in the aforementioned fourth invention, wherein, if a new mobile network node is added within the local network, and the mobile network node requests an assignment of an address to the mobile node, said mobile node comprises means for assigning any unregistered subsidiary home address to the mobile network node, and requesting additional registration of this subsidiary home address to the home agent, and if the mobile network node is deleted from within the local network, and the mobile network node notifies the mobile node of returning the subsidiary home address, the mobile node comprises means for requesting deregistration of this subsidiary home address to the home agent, whereby the number of registration of the subsidiary home addresses owned by the mobile node is dynamically increased or decreased according to the added or deleted mobile network nodes.

A sixth invention for achieving the aforementioned object, in the aforementioned fourth invention, wherein, if a new mobile network node is added within the local network managed by the mobile node, and the mobile network node requests an assignment of an address to the mobile node, said mobile node comprises means for acquiring a new subsidiary home address from the home agent, and assigning this to the mobile network node; and if the mobile network node is deleted from within the local network managed by the mobile node, and the mobile network node notifies the mobile node of returning the subsidiary home address, means for returning the subsidiary home address to the home agent, whereby the number of the subsidiary home addresses owned by the mobile node is dynamically increased or decreased according to the added or deleted mobile network nodes.

A seventh invention for achieving the aforementioned object, in the aforementioned first to sixth inventions, wherein, if the representative home address and any number of the subsidiary home addresses are simultaneously registered, updated, or deleted with respect to the home agent, said mobile node comprises means for transmitting information on all addresses in one message to the home agent.

An eighth invention for achieving the aforementioned object is a mobile node in a mobile communication system composed of a home agent, the mobile node, and one or more correspondent nodes, which comprises:

means for storing a preassigned representative home address, 0 or more preassigned subsidiary home addresses, a care-of address temporarily assigned in a network in which the mobile node is currently present; and means for making a registration request for joint information which relates the representative home address to all subsidiary home addresses, and the care-of address to said home agent, each time the mobile node moves to other network and is assigned a new care-of address.

A ninth invention for achieving the aforementioned object, in the aforementioned eighth invention, which further comprises:

means for registering a part of the subsidiary home addresses owned by the mobile node at the time of processing of the registration of said joint information, and managing the remaining as unregistered subsidiary home addresses;

means for requesting additional registration of the unregistered subsidiary home addresses to the home agent at a given point in time; and means for requesting deregistration of the registered subsidiary home addresses to the home agent.

A tenth invention for achieving the aforementioned object, in the aforementioned eighth and ninth inventions, which further comprises:

means for requesting an assignment of a new subsidiary home address to the home agent; and means for returning the assigned subsidiary home address to the home agent.

An eleventh invention for achieving the aforementioned object, in the aforementioned eighth to tenth inventions, which comprises:

means for assigning any subsidiary home address to a plurality of the mobile network nodes under the mobile node; and if a packet destined for the subsidiary home address assigned to the mobile network nodes arrives, transferring this to the corresponding mobile network node, whereby said mobile node performs location registration for the mobile network nodes in the local network managed by the mobile node by proxy, and transfers the packet destined for the mobile network node.

A twelfth invention for achieving the aforementioned object, in the aforementioned eleventh invention, which comprises:

if a new mobile network node is added within the local network, and the mobile network node requests an assignment of an address, means for assigning any unregistered subsidiary home address to the mobile network node, and requesting additional registration of this subsidiary home address to the home agent; and if the mobile network node is deleted from within the local network, and the mobile network node notifies returning the subsidiary home address, means for requesting deregistration of this subsidiary home address, whereby the number of registration of the subsidiary home addresses owned by the mobile node is dynamically increased or decreased according to the added or deleted mobile network nodes.

A thirteenth invention for achieving the aforementioned object, in the aforementioned eleventh invention, which comprises:

if a new mobile network node is added within the, local network managed by the mobile node, and the mobile network node requests an assignment of an address, means for acquiring a new subsidiary home address from the home agent, and assigning this to the mobile network node; and if the mobile network node is deleted from within the local network managed by the mobile node, and the mobile network node notifies returning the subsidiary home address, means for returning the subsidiary home address to the home agent, whereby the number of the subsidiary home addresses owned by the mobile node is dynamically increased or decreased according to the added or deleted mobile network nodes.

A fourteenth invention for achieving the aforementioned object, in the aforementioned eighth to thirteenth inventions, which comprises:

if the representative home address and any number of the subsidiary home addresses are simultaneously registered, updated, or deleted with respect to the home agent, means for transmitting information on all addresses in one message to the home agent.

A fifteenth invention for achieving the aforementioned object is a home agent in a mobile communication system composed of a home agent, a mobile node, and one or more correspondent nodes, which comprises:

means for receiving a registration request for joint information which relates the representative home address of the mobile node, a plurality of subsidiary home addresses owned by the mobile node, and a care-of address temporarily assigned to the mobile node in a network in which the mobile node is currently present, from the mobile node; and if a packet destined for the representative home address or any subsidiary home address arrives from a table in which the joint information is registered, and any correspondent node, means for retrieving the joint information including the representative home address or the subsidiary home address from said table, and transferring the packet to the care-of address corresponding to the address.

A sixteenth invention for achieving the aforementioned object, in the aforementioned fifteenth invention, which further comprises:

if additional registration of a subsidiary home address is requested from the mobile node, means for adding the address to the corresponding joint information of the mobile node; and if deregistration of the subsidiary home address is requested, means for erasing the address from the corresponding joint information of the mobile node.

A seventeenth invention for achieving the aforementioned object, in the aforementioned fifteenth and sixteenth inventions, which further comprises:

if an assignment of a new subsidiary home address is requested from the mobile node, means for selecting arbitrary address from an unassigned address group owned by the home agent to register this address with the joint information of the mobile node, and notifying the mobile node of it; and if the assigned subsidiary home address is returned from the mobile node, means for returning this to the unassigned addresses, and erasing this from the joint information of the mobile node.

An eighteenth invention for achieving the aforementioned object is a control program for a mobile node in a mobile communication system composed of a home agent, the mobile node, and one or more correspondent nodes, wherein said control program allows the mobile node to function as means for storing a preassigned representative home address, 0 or more preassigned subsidiary home addresses, and a care-of address temporarily assigned in a network in which the mobile node is currently present; and as means for making a registration request for joint information which relates the representative home address to all subsidiary home addresses, and the care-of address to the home agent, each time the mobile node moves to other network, and is assigned a new care-of address.

A nineteenth invention for achieving the aforementioned object, in the aforementioned eighteenth invention, wherein said control program further allows said mobile node to function as means for registering a part of the subsidiary home addresses owned by said mobile node at the time of processing of the registration of said joint information, and managing the remaining as unregistered subsidiary home addresses;

as means for requesting additional registration of the unregistered subsidiary home addresses to the home agent at a given point in time; and as means for requesting deregistration of the registered subsidiary home addresses to the home agent.

A twentieth invention for achieving the aforementioned object, wherein said control program further allows said mobile node to function as means for requesting an assignment of a new subsidiary home address to the home agent; and as means for returning the assigned home address to the home agent.

A twenty-first invention for achieving the aforementioned object, in the aforementioned eighteenth to twentieth inventions, wherein, said control program allows said mobile node to function as means for assigning any subsidiary home address to a plurality of the mobile network nodes under said mobile node, and if a packet destined for the subsidiary home address assigned to the mobile network nodes arrives, transferring this to the corresponding mobile network node.

A twenty-second invention for achieving the aforementioned object, in the aforementioned twenty-first invention, wherein, if a new mobile network node is added within a local network, and the mobile network node requests an assignment of an address, said control program allows said mobile node to function as means for assigning any unregistered subsidiary home address to the mobile network node, and requesting additional registration of this subsidiary home address to the home agent; and if the mobile network node is deleted from within the local network, and the mobile network node notifies returning the subsidiary home address, as means for requesting deregistration of this subsidiary home address.

A twenty-third invention for achieving the aforementioned object, in the aforementioned twenty-first invention, wherein, if a new mobile network node is added within a local network managed by the mobile node, and the mobile network node requests an assignment of an address, said control program allows said mobile node to function as means for acquiring a new subsidiary home address from the home agent, and assigning this to the mobile network node; and if the mobile network node is deleted from within the local network managed by the mobile node, and the mobile network node notifies returning the subsidiary home address, as means for returning the subsidiary home address to the home agent.

A twenty-fourth invention for achieving the aforementioned object, in the aforementioned eighteenth to twenty-third inventions, wherein, if the representative home address and any number of the subsidiary home addresses are simultaneously registered, updated, or deleted with respect to the home agent, said control program allows said mobile node to function as means for transmitting information on all addresses in one message to the home agent.

A twenty-fifth invention for achieving the aforementioned object is a control program for a home agent in a mobile communication system composed of the home agent, a mobile node, and one or more correspondent nodes, wherein said control program allows said home agent to function as means for receiving a registration request for joint information which relates the representative home address of the mobile node, a plurality of subsidiary home addresses owned by the mobile node, a care-of address temporarily assigned to the mobile node in a network in which the mobile node is currently present, from the mobile node, and storing the joint information; and if a packet destined for the representative home address or any subsidiary home address arrives from any correspondent node, as means for retrieving the joint information including the representative home address or the subsidiary home address from the stored joint information, and transferring the packet to the care-of address corresponding to the address.

A twenty-sixth invention for achieving the aforementioned object, in the aforementioned twenty-fifth invention, wherein, if additional registration of a subsidiary home address is requested from the mobile node, said control program allows said home agent to function as means for adding the address to the corresponding joint information of the mobile node; and if deregistration of the subsidiary home address is requested, as means for erasing the address from the corresponding joint information of the mobile node.

A twenty-seventh invention for achieving the aforementioned object, in the aforementioned twenty-fifth and twenty-sixth inventions, wherein, if an assignment of a new subsidiary home address is requested from the mobile node, said control program allows said home agent to function as means for selecting any address from an unassigned address group owned by the home agent to register this address with the joint information of the mobile node, and notifying the mobile node of it; and if the assigned subsidiary home address is returned from the mobile node, as means for returning this to the unassigned addresses, and erasing this from the joint information of the mobile node.

A twenty-eighth invention for achieving the aforementioned object is an address management method in a mobile communication system composed of a home agent, a mobile node, and one or more correspondent nodes, wherein the mobile node comprises the steps of:
when a new care-of address is assigned by that a temporarily assigned care-of address moves to other network,
making a registration request for joint information which relates to this new assigned care-of address, a preassigned representative home address, and 0 or more preassigned subsidiary home addresses to the home agent, and wherein the home agent comprises the steps of:
receiving the registration request for said joint information from the mobile node, and storing the joint information; and
if a packet destined for the representative home address or any subsidiary home address arrives from any correspondent node,
retrieving the joint information including the representative home address or the subsidiary home address from the stored joint information, finding the care-of address corresponding to the address on the basis of the joint information, and transferring said packet to the care-of address.

A twenty-ninth invention for achieving the aforementioned object, in the aforementioned twenty-eighth invention, wherein the mobile node does not register a part of the subsidiary home addresses owned by the mobile node with the home agent during processing of the registration of the joint information, requests additional registration of the unregistered subsidiary home addresses to the home agent at a point in time when the unregistered subsidiary home addresses become necessary, and requests deregistration of the registered subsidiary home addresses to the home agent, if the registered subsidiary home addresses become unnecessary, and wherein said home agent makes additional registration or deregistration of the subsidiary home addresses in the corresponding joint information of the mobile node based on the registration request of the home agent, whereby the number of the subsidiary home addresses which, will be used, out of the subsidiary home addresses owned by the mobile node may be dynamically changed.

A thirtieth invention for achieving the aforementioned object, in the aforementioned twenty-eighth and twenty-ninth inventions, wherein the home agent has the unassigned addresses, and if an assignment of a new subsidiary home address is requested from the mobile node, selects any address from the unassigned addresses owned by the home agent to register this address with the joint information of said mobile node, and notifies the mobile node of it, thereby allowing the mobile node to acquire the new subsidiary home address, and wherein, if the subsidiary home address becomes unnecessary, the mobile node returns this subsidiary home address to the home agent, and the home agent erases the subsidiary home address from the joint information, whereby the number of the subsidiary home addresses owned by the mobile node may be dynamically changed.

Effects of the Invention

In accordance with the present invention, it is possible for an HA to efficiently maintain registration information of an MR.

In addition, information on all addresses is adapted to be transmitted in one message to the home agent, thus providing improved communication efficiency in registration/update processing between the HA and the MR.

BEST MODE FOR CARRYING OUT THE INVENTION

In accordance with the present invention, in a mobile communication system composed of a home agent, a mobile node, and one or more correspondent nodes, the mobile node has a representative home address, a subsidiary home address, and a care-of-address, and registers information (joint information) showing the relation between the representative home address and all subsidiary home addresses and the care-of-address with home agent each time the mobile node moves to another network and is assigned a new care-of-address.

The home agent receives a registration request for the joint information, stores the registration information, and if a packet destined for the representative home address, or a packet destined for any subsidiary home address arrives from any correspondent node (e.g., HA) retrieves the joint information including its address from the registration information maintained thereby, and transfers the packet to the corrseponding care-of-address.

The representative home address, as used herein, is a home address reassigned to a mobile node, for example, HoA (Home Address), and the like.

In addition, the subsidiary home address, as used herein, is an address which the mobile node assigns to a mobile terminal MNN (Mobile Network Node) of a network under the control thereof, with the mobile node having a plurality of the same, e.g., subsidiary home addresses.

In addition, the care-of address as used herein is an address temporarily assigned in a network in which a mobile node is currently present, for example, CoA (Care-of-Address), and the like.

Thus, the present invention is characterized in that the mobile node communicates using a plurality of the home addresses (representative home address, subsidiary home address, and care-of address). More specifically, one mobile node in which one representative home address is related to a care-of address, and further a plurality of subsidiary home addresses are related to the representative home address conducts communication on less registration information by retrieving this relation.

Hereinafter, a specific embodiment will be described. It should be noted that the following embodiment will describe taking HoA (Home Address) as a representative home address, an additional address as a subsidiary home address, and CoA (Care-of-Address) as a care-of address.

EMBODIMENT 1

An embodiment 1 of the present invention will be described.

Figure 1:
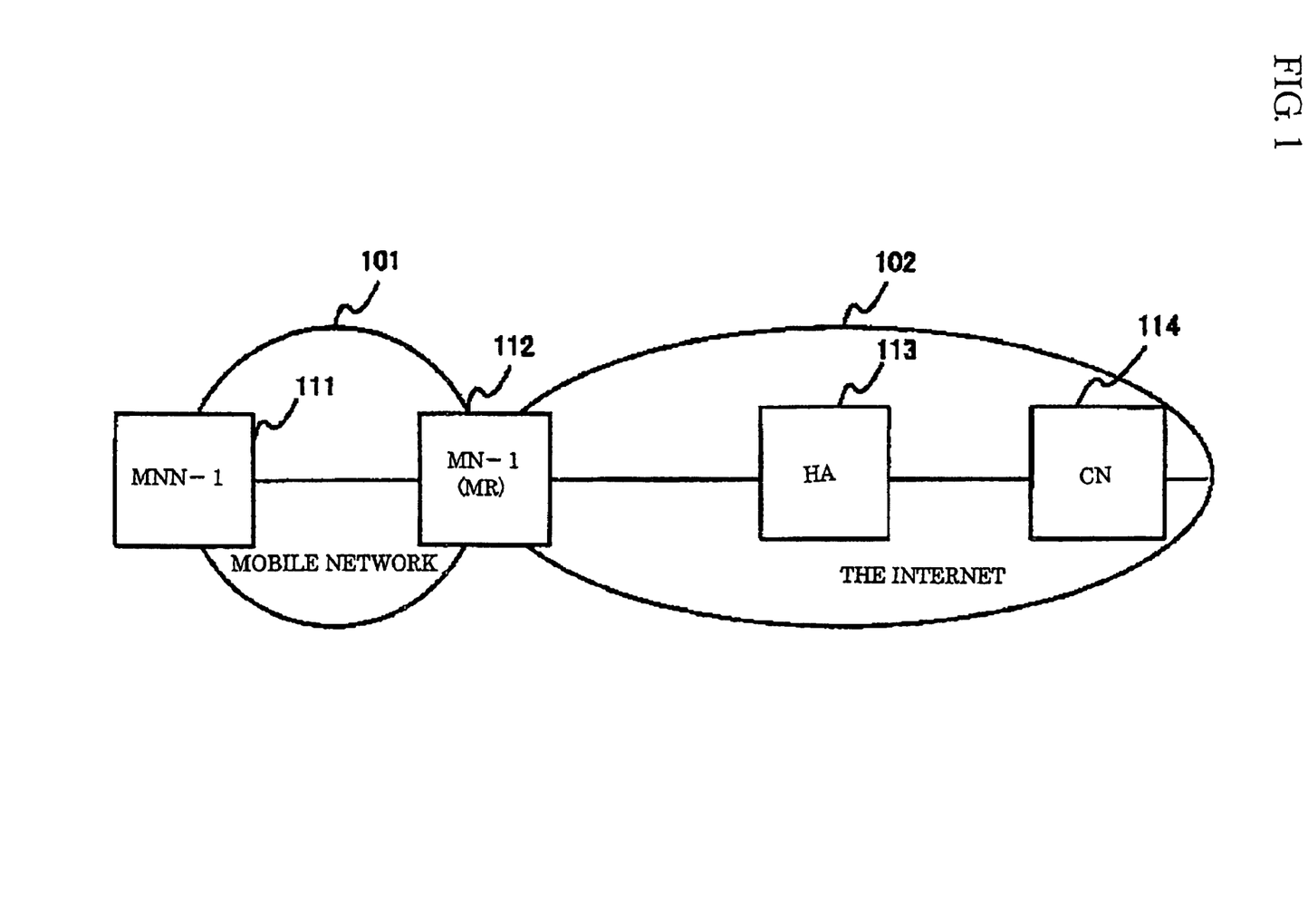
FIG. 1 is a diagram showing the configuration of a network to which the present invention is applied.

FIG. 1 is a diagram showing the configuration of a network to which the present invention is applied. Referring to FIG. 1, the present invention comprises a mobile network 101 and an internet 102.

The internet 102 is network configuration composed of any number of MNs (Mobile Nodes, only an MN-1 is shown in the drawing), an HA (Home Agent), and a CN (Correspondent Node). The MN-1 registers the CoA with the HA using a Mobile IP, and when a packet destined for the MN-1 arrives at the network, the HA transfers the packet to the CoA of the MN-1.

The mobile network 101 is network configuration composed of the MN-1 and any number of MNNs (Mobile Network Nodes, only an MNN-1 is shown in the drawing). An example of the mobile network 101 includes a network built in a vehicle such as a train and a car. The MN-1 works as an MR (Mobile Router) having the function of a router with respect to the internet 102. In the hereinafter description, the MN having the function of the MR is designated as the MR. The MNN-1 and the CN communicate via the MN-1 and the HA to each other.

Figure 2:
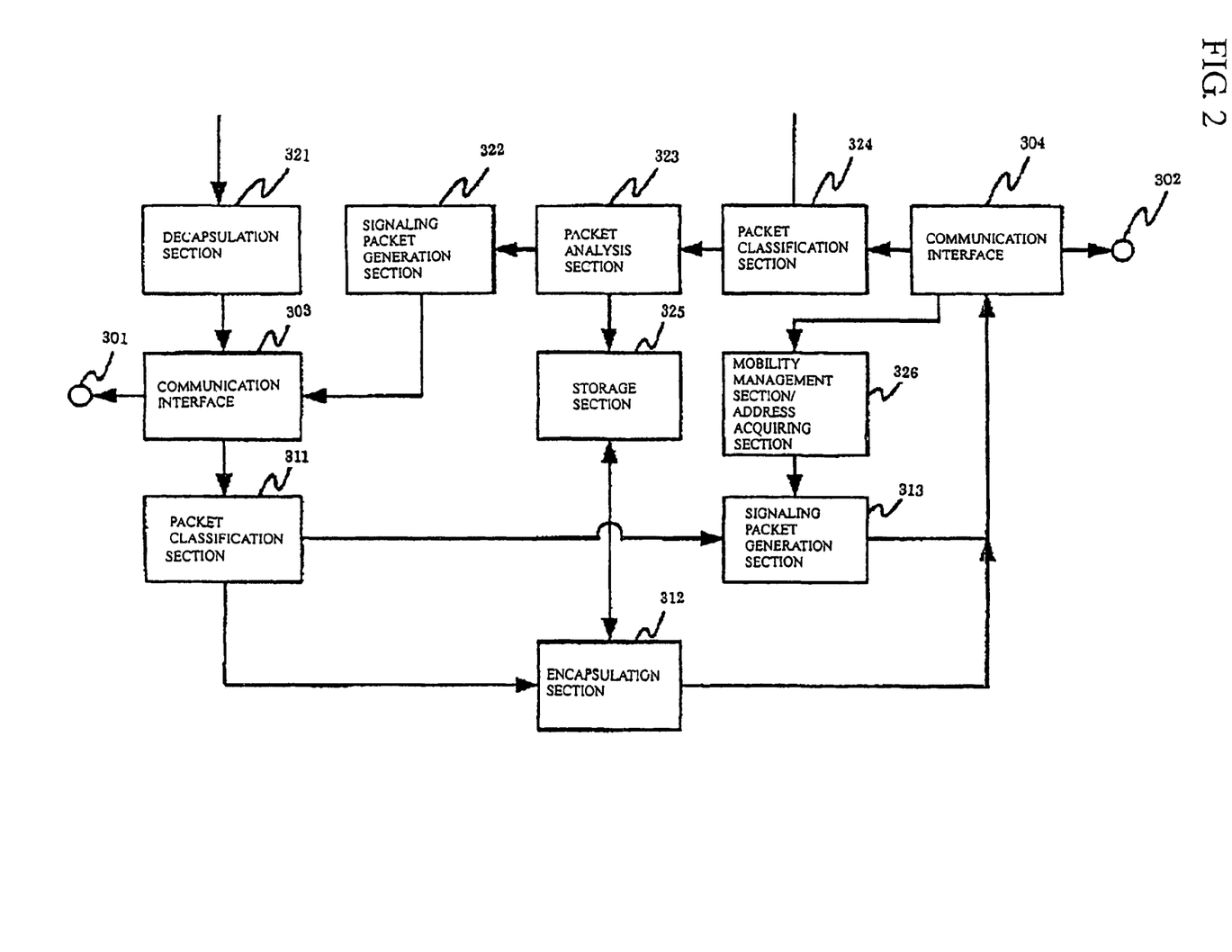
FIG. 2 is a block diagram of an MR 112.

Next, the configuration of an MR 112 (Mobile Router) will be described.

FIG. 2 is a block diagram of the MR 112.

The MR-112 is composed of an input/output terminal 301 for connecting to the mobile network 101, a communication interface 303 for inputting/outputting to this input/output terminal 301, an input/output terminal 302 for connecting to the internet, a communication interface 304 for inputting/outputting to this input/output terminal 302, a packet classification section 324 for classifying input packets from the internet, a packet analysis section 323 for analyzing classified signaling packets, a signaling packet generation section 322 for generating a signaling packet which is transmitted to the MNN, a decapsulation section 321 for decapsulating an encapsulated packet, a storage section 325 for storing information, a mobility management/address acquiring section 326 for detecting the mobility of the mobile network 101 to acquire a new address, a packet classification section 311 for classifying input packets from the mobile network, a signaling packet generation section 313 for generating a signaling message addressed to an HA 113, and an encapsulation section 312 for encapsulating a packet. Incidentally, it is only necessary to provide at least one communication interface, and thus it is acceptable to configure so that a plurality of the communication interfaces are provided, and used at the same time. It should be noted that each section described above may be made up of CPU, and the like operating under a control program.

Figure 3:
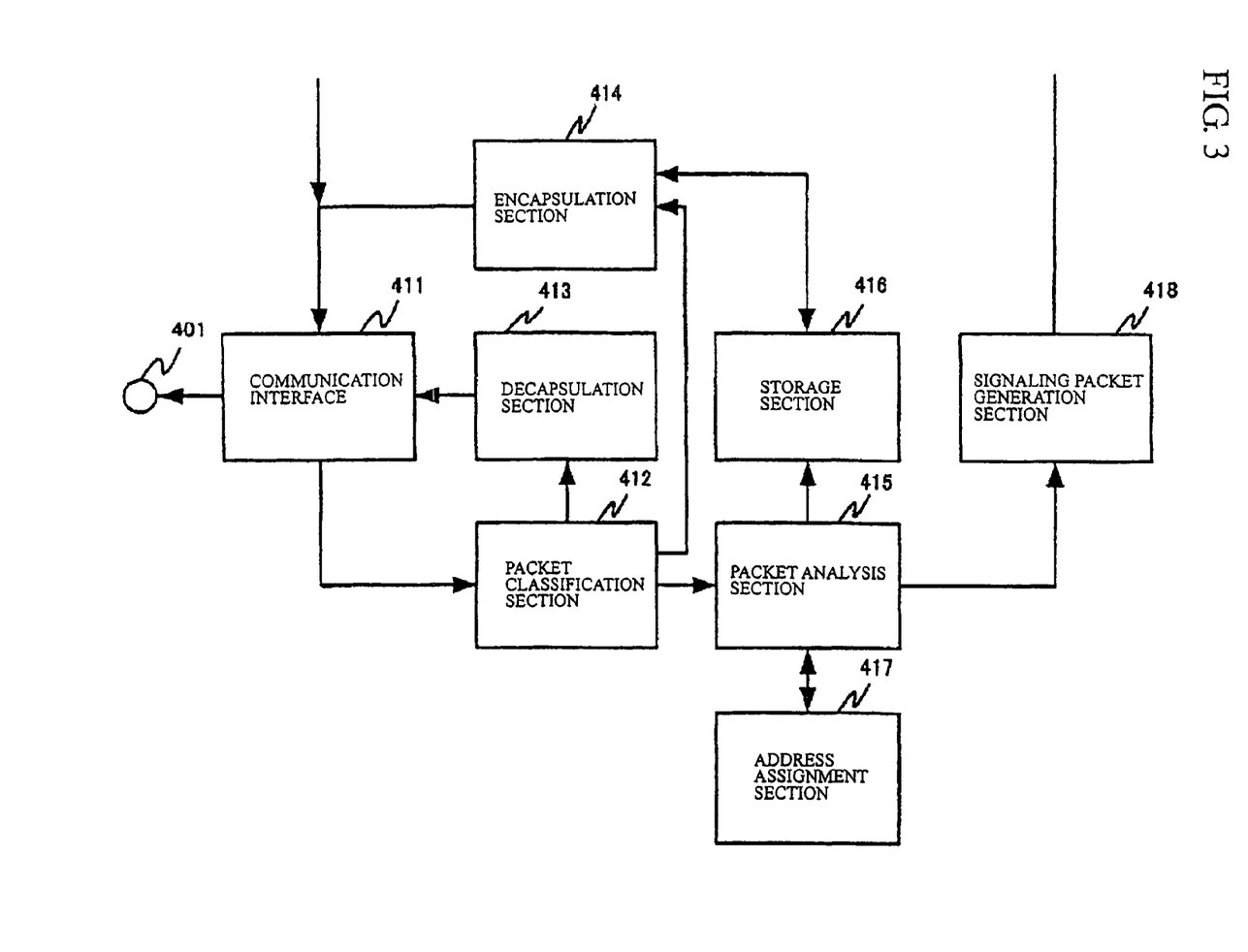
FIG. 3 is a block diagram of an HA 113.

Subsequently, the configuration of the HA113 (Home Agent) will be described.

FIG. 3 is a block diagram of the HA113.

The HA113 is composed of an input/output terminal 401 to the internet, a communication interface 411 for inputting/outputting to this input/output terminal 401, a packet classification section 412 for classifying inputted packets, a packet analysis section 415 for analyzing contents when an inputted packet is a signaling packet, an address assignment section 417 for assigning an address when an address assignment request for the MNN occurs, a storage section 416 for storing information, a signaling packet generation section 418 for returning a response to a signaling, an encapsulation section 414 for encapsulating a packet, and a decapsulation section 413 for decapsulating an encapsulated packet. It should be noted that each section described above may be made up of CPU, and the like operating under a control program.

Next, the operation in the aforementioned configuration will be described with reference to the drawings.

Figure 4:
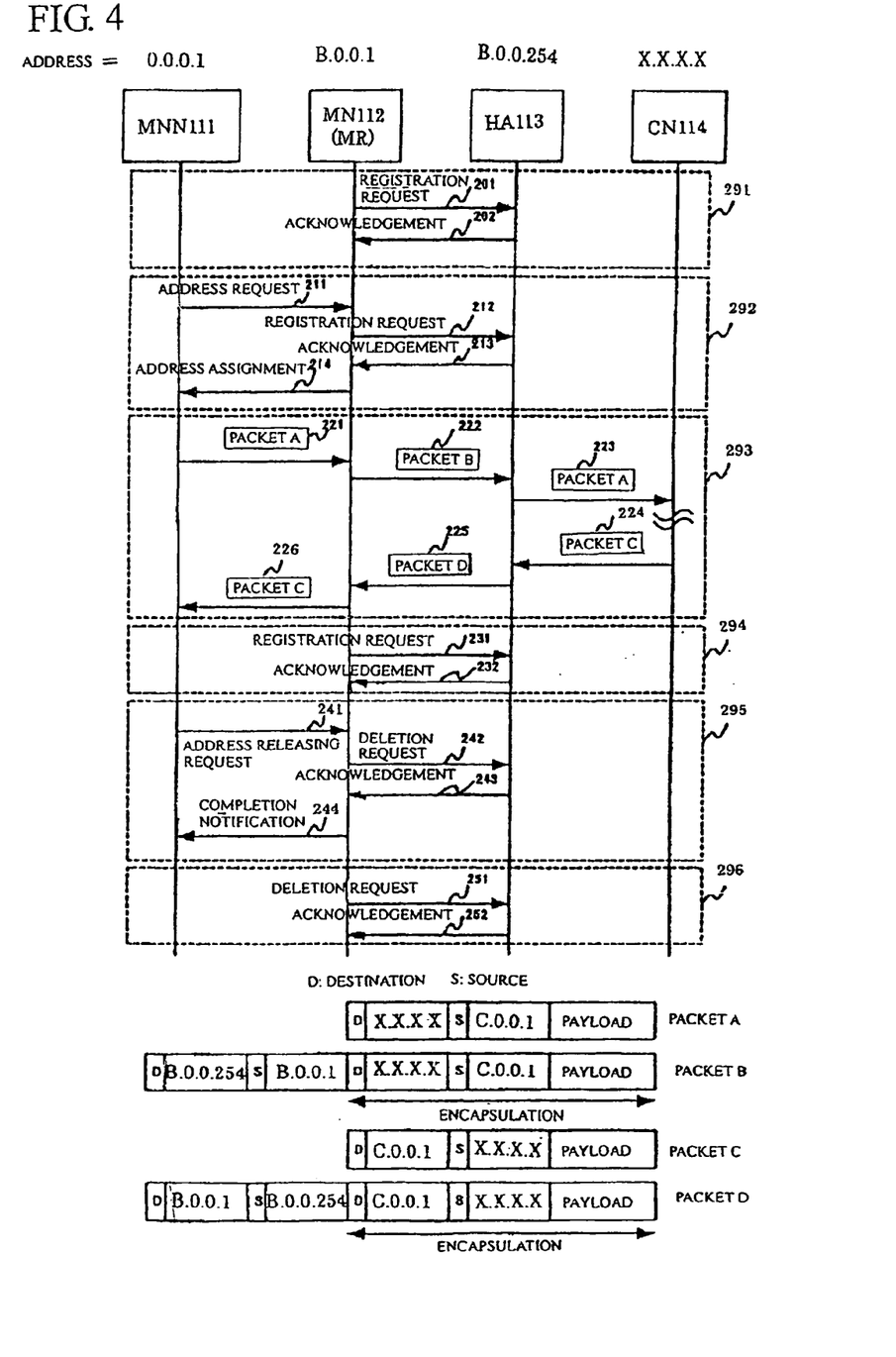
FIG. 4 is a diagram showing the sequence of communication.
Figure 5:
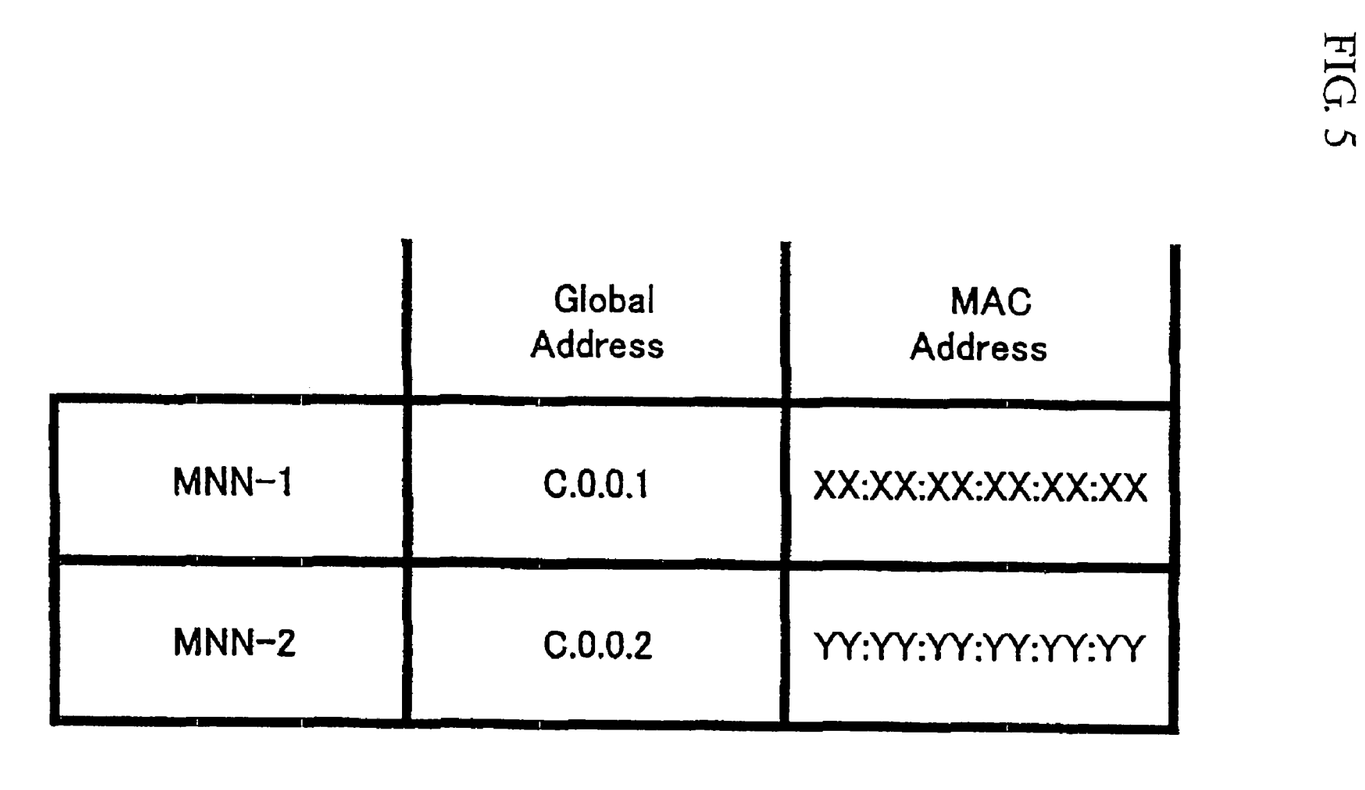
FIG. 5 is a diagram showing an example of MNN management table owned by an MR.
Figure 6:
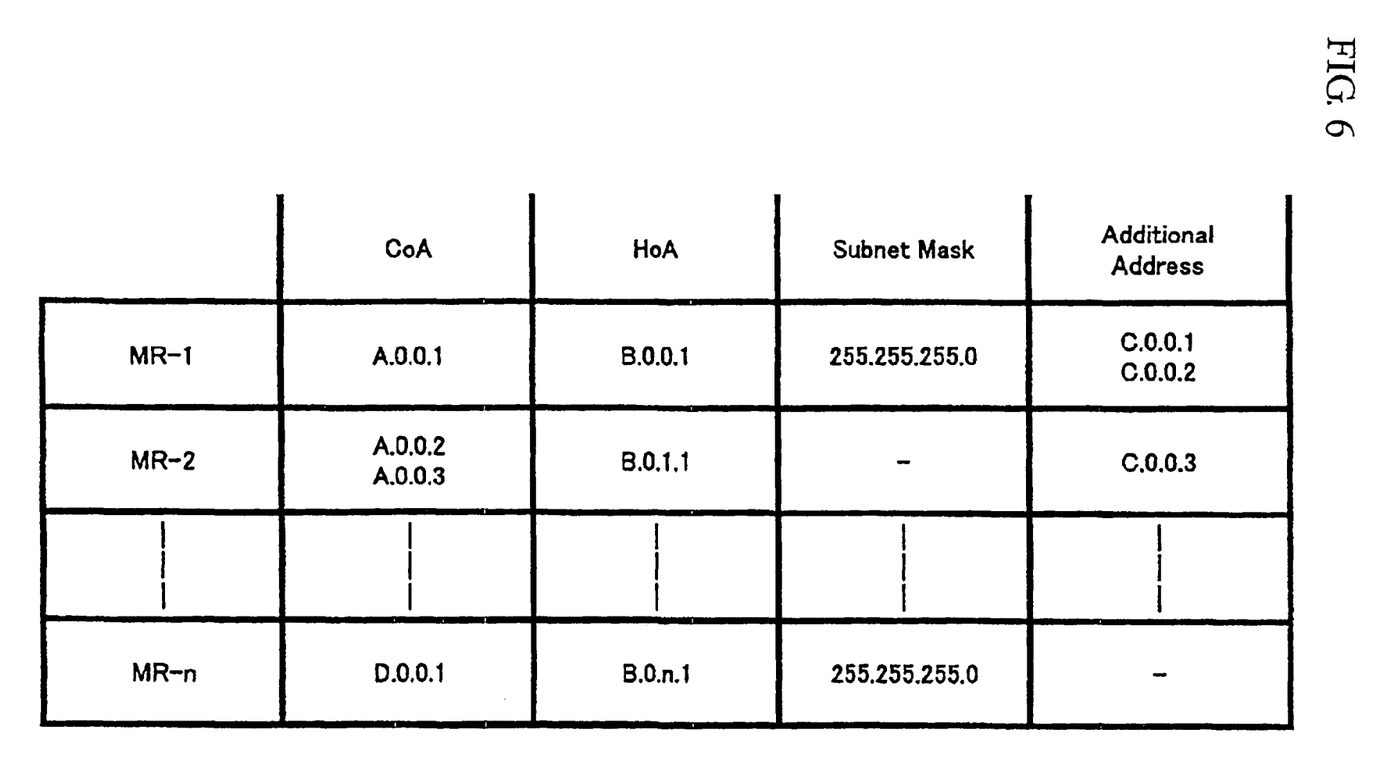
FIG. 6 is a diagram showing an example of an MR management table owned by an HA.

FIG. 4 is a diagram showing a communication sequence, FIG. 5 is a diagram showing an example of an MNN management table owned by the MR, and FIG. 6 is a diagram showing an example of an MR management table owned by the HA.

First, the transmitting and receiving sequence of a message will be described with reference to FIG. 4.

As shown in FIG. 4, the present invention is largely divided into CoA registration processing 291 for registering the CoA acquired by the MR with the HA, global address registration processing 292 which the MR performs at its own right time, or in which the MR triggers an address request from the MNN, data communication processing 293 for conducting data communication between the MNN and the CN, CoA update processing 294 for updating the entry of the MR registered with the HA, global address releasing processing 295 for triggering an address releasing request from the MNN, and CoA deletion processing 296 for deleting registration of the MR itself.

First, the CoA registration processing 291 will be described.

In the MR 112, the mobility management/address acquiring section 326 acquires an address for the communication interface 304 connected to the internet by processing such as the DHCP protocol, a PPP automatic line connection, and address automatic generation processing in IPv6. The acquired address ends in a CoA. The signaling packet generation section 313 then generates a signaling packet (registration request packet 201) of a registration request containing the CoA (Care-of-Address) and the HoA (Home Address), and passes it to the communication interface 304. The communication interface 304 transmits the registration request packet 201 to the HA 113 via the input/output terminal 302.

When arriving at the HA 113, the registration request packet 201 is delivered to the packet classification section 412 via the input/output terminal 401 and the communication interface 411. The packet classification section 412 identifies the received packet to be the registration request packet 201, and passes the registration request packet 201 to the packet analysis section 415. The packet analysis section 415 refers to the storage section 416 to ensure that there is no corresponding entry of the MR. The packet analysis section 415 relates the HoA to the CoA, records it on the management table of the storage section 416, and sets a timer for automatically deleting entries. FIG. 6 shows an example of the MR management table. In addition, the packet analysis section 415 allows the signaling packet generation section 418 to generate a signaling packet for acknowledgement (acknowledgment packet 202) in order to respond to the MR 112 that the registration has been normally completed. The signaling packet generation section 418 passes the acknowledgment packet 202 to the communication interface 411. The communication interface 411 transmits the acknowledgment packet 202 to the MR 112 via the input/output terminal 401.

Upon receipt of the acknowledgment packet 202 from the input/output terminal 302 and the communication interface 304, the MR 112 identifies the acknowledgment packet 202 to be a signaling packet in the packet classification section 324, and passes it to the packet analysis section 323. The packet analysis section 323 analyzes the received acknowledgement packet to confirm that the registration has succeeded, and discards the acknowledgement packet 203.

Next, the global address registration processing 292 will be described.

The type of address of an MNN 111 includes a global address which is unique even outside a mobile network, and a private address which the MR 112 assigns to the MNN 111 in the mobile network using NAT. However, it is assumed that the former is routed by means of the global address outside the mobile network, but the private address can be further used in the range of an operator network, and the like. In this case, a unique private address is used, which has nothing to do with the present invention. Hereinafter, the present invention uses a global address.

The former case is divided into a case of using an address which is statically preassigned to the MNN (Case A), and a case of dynamically acquiring an address from a server in the internet (Case B). However, in either case, the following global address registration processing is performed. In the latter case, the private address is used during a mobile network connection, and when the global address is required later, the global address registration processing is performed (Case C).

In the global address registration processing 292, address request processing is first performed by an address request packet 211 which is transmitted from the MNN 111 to the MR 112. However, this request is not always one message. For example, the Case A includes a case in which a packet is transmitted for the first time, the Case B includes processing using a protocol such as DHCP, and the Case C includes processing using PPPoE.

In the MR 112, when the communication interface 303 receives an address request 211 from the MNN 111 via the input/output terminal 301, the packet classification section 311 then identifies the address request 211 to be an address request message, and notifies the signaling packet generation section 313 of it. This signaling packet generation section 313 depends on an address acquiring method of the MNN 111, generates a source address in the Case A, and generates signaling packets (registration request packet 212) including the effect that the message is a DHCP request in the Cases B and C, and the registration request packet 212 is transmitted to the HA 113 via the communication interface 304 and the input/output terminal 302.

After arriving at the HA 113, the registration request packet 212 is delivered to the packet classification section 412 via the input/output terminal 401 and the communication interface 411 in the HA 113. The packet classification section 412 identifies the received packet to be the registration request packet 212, and passes the registration request packet 212 to the packet analysis section 415. The packet analysis section 415 refers to the storage section 416 to recognize that the registration request packet 212 is a message to the CoA and the HoA of the MR 112 which is already present. Then, the packet analysis section 415 checks whether it is a static address registration request or a dynamic address acquiring request, and in the case of the dynamic address acquiring request, acquires an address which will be assigned to the MNN 111 from the address assignment section 417. Then, the packet analysis section 415 registers the address with the management table of the storage section 416 as an additional address to already existing entries. For example, if the MR management table in FIG. 6 is maintained, the additional address is written into an additional address column. In addition, the packet analysis section 415 directs the signaling packet generation section 418 to generate a signaling packet for acknowledgement (acknowledgement packet 213) in order to respond to the MR 111 that the registration has been normally completed.

The signaling packet generation section 418 passes the acknowledgement packet 213 to the communication interface 411. The communication interface 411 transmits the acknowledgement packet 213 to the MR 112 via the input/output terminal 401.

Upon receipt of the acknowledgment packet 202 from the input/output terminal 302 and the communication interface 304, the MR 112 identifies the acknowledgment packet 202 to be a signaling packet in the packet classification section 324, and passes the acknowledgment packet 213 to the packet analysis section 323. The packet analysis section 323 analyzes the received acknowledgement packet to confirm that the registration has succeeded, records the address of the MNN 111 and an MAC address on the storage section 325 as ready to be routed, and discards the acknowledgement packet 203. In addition, the packet analysis section 323 instructs the signaling packet generation section 322 to generate a signaling message (address assignment packet 214) corresponding to the address request packet 211 from the MNN 111. The signaling packet generation section 322 passes the address assignment packet 214 to the communication interface 303. The communication interface 303 transmits the address assignment packet 214 to the MNN 111 via the input/output section 301.

Upon receipt of the address assignment packet 214, the MNN 111 recognizes that the address has normally been registered. Especially, in the case of the Cases B and C, addresses which will be used are notified, followed by using the addresses thereof for communication.

However, the MR 112 pools a certain number of global addresses in advance, and if the certain number of the global addresses is closed within the mobile network to complete address assignment processing when the MN 111 is connected to the mobile network, the MR may perform the global address registration processing 292 described above together with the CoA registration processing 291 with respect to the addresses owned by the MR.

The processing hereinbefore allows the storage capacity of the management table within the HA to be saved in comparison with a case of independently registering an address.

Next, processing for the case of communicating between the MNN 111 and a CN 114 will be described.

First, the flow of a packet from the MNN 111 to the direction of the CN 114 will be described.

A packet (packet A 221) whose destination is the CN 114, and whose source is the MNN 111 is transmitted from the MN 111, and arrives at the packet classification section 311 via the input/output terminal 301 connected to the mobile network site of the MR 112 and the communication interface 311. The packet classification section 311 recognizes the packet to be a data packet from the MNN 111 to CN 114, and passes the packet to the encapsulation section 312, which then encapsulates the received packet. Specifically, the packet classification section 311 converts the received packet A 221 into a payload, and generates a packet, the destination in the header part of which is set to the HA 113. The encapsulation section 312 passes the packet to the communication interface 304. The communication interface 304 transmits the packet to the HA 113 via the input/output terminal 302.

After arriving at the HA 113, a packet B222 is delivered to the packet classification section 412 through the input/output terminal 401 and the communication interface 411 in the HA 113. The packet classification section 412 recognizes the received packet to be a data communication packet from the MNN to the CN, and passes the packet B222 to the decapsulation section 413. The decapsulation section 413 removes the header of the packet passed, and retrieves a packet A223 in the payload part. The retrieved packet A223 is transferred to the CN 114 via the communication interface 411 and the input/output terminal 401.

Next, the flow of a packet from the CN 114 to the direction of the MNN 111 will be described.

After a packet C224 which is transmitted from the CN 114 to the MNN 111 arrives at the HA 113, the packet C224 is delivered to the packet classification section 413 through the input/output terminal 401 and the communication interface 411 in the HA 113.

The packet classification section 413 identifies the received packet to be a data communication packet from the CN 114 to the MR 112, and passes the packet C224 to the encapsulation section 414. The encapsulation section 414 refers to the storage section 416 to encapsulate the received packet. Specifically, the encapsulation section 414 converts the received packet C224 into a payload, and generates a packet, the destination in the header part of which is set to the MR 112. The encapsulation section 414 passes a packet D225 generated to the communication interface 411. The packet D225 is transferred to the MR 112 via the communication interface 411 and the input/output terminal 401.

Upon receipt of the packet D225 from the input/output terminal 302 and the communication interface 304, the MR 112 identifies the received packet to be a data packet destined for the MNN 111 in the packet classification section 324, and passes the received packet to the decapsulation section 321. The decapsulation section 321 removes the header of the packet passed and retrieves a packet C226 in the payload part. The retrieved packet C226 is transferred to the MNN 111 via the communication interface 311 and the input/output terminal 301.

The CoA update processing 294 will be described.

Since the entry of the MR 112 registered with the HA 113 in the CoA registration processing 291 is automatically deleted after a lapse of time, it is necessary to reregister the entry at regular time intervals in order to prevent the registered entry from being deleted. The reregistration processing is the CoA update processing 294.

In the MR 112, the signaling packet generation section 313 generates a signaling packet (registration packet 231) of a registration request including the global address maintained by the MNN in the mobile network obtained by referring to the CoA, the HoA, and the storage section 325 intended for the HA 1134, and passes the registration packet 231 to the communication interface 304. The communication interface 304 transmits the registration packet 231 to the HA 113 via the input/output terminal 302.

After arriving at the HA 113, the registration request packet 231 is delivered to the packet classification section 412 via the input/output terminal 401 and the communication interface 411. The packet classification section 412 identifies the received packet to be the registration request packet 231, and passes the registration request packet 201 to the packet analysis section 415. The packet analysis section 415 refers to the storage section 416 to search for the corresponding entry of the MR, and resets the timer for automatically deleting the entries. In addition, the packet analysis section 415 allows the signaling packet generation section 418 to generate a signaling packet for acknowledgement (acknowledgment packet 232) in order to respond to the MR 112 that the registration has been normally completed. The signaling packet generation section 418 passes the acknowledgment packet 232 to the communication interface 411. The communication interface 411 transmits the acknowledgment packet 232 to the MR 112 via the input/output terminal 401.

Upon receipt of the acknowledgment packet 232 from the input/output terminal 302 and the communication interface 304, the MR 112 identifies the received acknowledgement packet to be a signaling packet in the packet classification section 324, and passes the received acknowledgement packet to the packet analysis section 323. The packet analysis section 323 analyzes the received acknowledgement packet to confirm that the registration has succeeded, and discards the acknowledgement packet 233.

The processing hereinbefore allows the related addresses to be updated by one message, whereby improved communication efficiency can be expected.

Next, the global address releasing processing 295 will be described.

When the MNN 111 whose address has been registered in the global address registration processing 292 stops using a global address, for example, in the case of leaving the mobile network, the global address releasing processing 295 takes place.

In the global address releasing processing 295, an address releasing request packet 241 is first transmitted from the MNN 111 to the MR 112. This releasing request represents processing corresponding to the global address registration processing, and is not always one message.

In the MR 112, when the communication interface 303 receives the address releasing request 241 from the MNN 111 via the input/output terminal 301, the packet classification section 313 then identifies the address releasing request 241 to be an address releasing request message, and notifies the signaling packet generation section 313 of it. This signaling packet generation section 313 generates a signaling packet (deletion request packet 242) for address releasing corresponding to an address acquiring method in the MNN 11, and the deletion request packet 242 is transmitted to the HA 113 via the communication interface 304 and the input/output terminal 302.

After arriving at the HA 113, the deletion request packet 242 is delivered to the packet classification section 412 through the input/output terminal 401 and the communication interface 411 in the HA. 113. The packet classification section 412 identifies the received packet to be the deletion request packet 242, and passes the deletion request packet 242 to the packet analysis section 415. The packet analysis section 415 refers to the storage section 416 to recognize the deletion request packet 242 to be a message to the CoA and the HoA of the MR which is already present.

Then, the packet analysis section 415 deletes the address which is requested to be deleted, from the corresponding entries in the management table of the storage section 416. In addition, the packet analysis section 415 directs the signaling packet generation section 418 to generate a signaling packet for acknowledgement (acknowledgement packet 243) in order to respond to the MR 112 that the deletion has been normally completed. The signaling packet generation section 418 passes the acknowledgement packet 243 to the communication interface 411. The communication interface 411 transmits the acknowledgement packet 243 to the MR 112 via the input/output terminal 401.

Upon receipt of the acknowledgment packet 243 from the input/output terminal 302 and the communication interface 304, the MR 112 identifies the acknowledgment packet 243 to be a signaling packet in the packet classification section 324, and passes the acknowledgment packet 243 to the packet analysis section 323. The packet analysis section 323 analyzes the received acknowledgement packet to confirm that the deletion has succeeded, and discards the acknowledgement packet 243.

In addition, the packet analysis section 323 instructs the signaling packet generation section 322 to generate a signaling message (completion notification packet 244) corresponding to the address request packet 241 from the MNN 111. The signaling packet generation section 322 passes the completion notification packet 244 to the communication interface 303. The completion notification packet 244 arrives at the MNN via the input/output section 301.

The CoA deletion processing 296 will be described.

Where the MR terminates communication, the CoA deletion processing 296 takes place.

The signaling packet generation section 313 generates a deletion request packet 251 intended for the HA 113, and passes it to the communication interface 304. The deletion request packet 251 is transmitted to the HA 113 via the input/output terminal 302.

After arriving at the HA 113, the deletion request packet 251 is delivered to the packet classification section 412 through the input/output terminal 401 and the communication interface 411 in the HA 113. The packet classification section 412 identifies the received packet to be the deletion request packet 251, and passes the deletion request packet 251 to the packet analysis section 415. The packet analysis section 415 analyzes the packet, and deletes the corresponding entry of the MR 112 from the storage section 416. In addition, the packet analysis section 415 directs the signaling packet generation section 418 to generate a signaling packet for acknowledgement (acknowledgement packet 252) in order to respond to the MR 112 that the deletion has been normally completed. The signaling packet generation section 418 passes the acknowledgement packet 252 to the communication interface 411. The communication interface 411 transmits the acknowledgement packet 252 to the MR 112 via the input/output terminal 401.

Upon receipt of the acknowledgment packet 243 from the input/output terminal 302 and the communication interface 304, the MR 112 identifies the acknowledgment packet 243 to be a signaling packet in the packet classification section 324, and passes the acknowledgment packet 243 to the packet analysis section 323. The packet analysis section 323 analyzes the received acknowledgement packet to confirm that the deletion has succeeded to terminate the operation.

It should be noted that the encapsulation technology in the above description is an example of means for tunneling between a mobile router and a home agent, and may be realized by the use of an MIPv6 header option and MPLS (Multi Protocol Label Switching) as other means. In that case, the mobile router, the encapsulation section and the decapsulation section in the home agent replace a function section corresponding to application technology.

What is claimed is:
1. A mobile communication system composed of a home agent, a mobile node, and one or more correspondent nodes, wherein said mobile node comprises:
    means for storing a preassigned representative home address, one or more preassigned subsidiary home addresses, and a care-of address temporarily assigned in a network in which the mobile node is currently present; and
    means for making a registration request for joint information which relates the representative home address to all subsidiary home addresses and the care-of address to said home agent, each time the mobile node moves to other network, and is assigned a new care-of address, and
wherein said home agent comprises:
    means for receiving the registration request for said joint information, and if a packet destined for the representative address or any of the subsidiary addresses arrives from any correspondent node, retrieving the joint information including the representative home address or the subsidiary home address, from a table in which the joint information is registered, and transferring the packet to the care-of address corresponding to the address for which the packet is destined; and
    a plurality of mobile network nodes being located under said mobile node, the plurality of mobile network nodes constituting a local network with said mobile node as a router,
wherein said mobile node further comprises:
    means for assigning the subsidiary home addresses to the mobile network nodes, and if a packet destined for the subsidiary home address assigned to the mobile network nodes arrives, transferring the packet to the corresponding mobile network node, whereby said mobile node performs location registration for the mobile network nodes in the local network managed by said mobile node by proxy, and transfers the packet destined for the mobile network node.

2. The mobile communication system according to claim 1, wherein, if a new mobile network node is added within the local network, and the mobile network node requests an assignment of an address to the mobile node, said mobile node comprises:

means for assigning any unregistered subsidiary home address to the mobile network node, and requesting additional registration of this subsidiary home address to the home agent; and if the mobile network node is deleted from within the local network, and the mobile network node notifies the mobile node of returning the subsidiary home address, means for requesting deregistration of this subsidiary home address, whereby the number of registration of the subsidiary home addresses owned by the mobile node is dynamically increased or decreased according to the added or deleted mobile network nodes.

3. The mobile communication system according to claim 1, wherein, if a new mobile network node is added within the local network managed by the mobile node, and the mobile network node requests an assignment of an address to the mobile node, said mobile node comprises:

means for acquiring a new subsidiary home address from the home agent, and assigning this to the mobile network node; and if the mobile network node is deleted from within the local network managed by the mobile node, and the mobile network node notifies the mobile node of returning the subsidiary home address, the mobile node comprises:

means for returning the subsidiary home address to the home agent, whereby the number of the subsidiary home addresses owned by the mobile node is dynamically increased or decreased according to the added or deleted mobile network nodes.

4. A mobile node in a mobile communication system composed of a home agent, the mobile node, and one or more correspondent nodes, the mobile node comprising:

means for storing a preassigned representative home address, one or more preassigned subsidiary home addresses, and a care-of address temporarily assigned in a network in which the mobile node is currently present;

means for making a registration request for joint information which relates the representative home address to all subsidiary home addresses and the care-of address to said home agent, each time the mobile node moves to other network, and is assigned a new care-of address; and means for assigning any subsidiary home address to a plurality of the mobile network nodes under the mobile node, and if a packet destined for the subsidiary home address assigned to the mobile network nodes arrives, transferring the packet to the corresponding mobile network node, whereby the mobile node performs location registration for the mobile network nodes in the local network managed by the mobile node by proxy, and transfers the packet destined for the mobile network node.

5. The mobile node according to claim 4, comprising:

if a new mobile network node is added within the local network, and the mobile network node requests an assignment of an address, means for assigning any unregistered subsidiary home address to the mobile network node, and requesting additional registration of the subsidiary home address to the home agent; and if the mobile network node is deleted from within the local network, and the mobile network node notifies returning the subsidiary home address, means for requesting deregistration of the subsidiary home address, whereby the number of registration of the subsidiary home addresses owned by the mobile node is dynamically increased or decreased according to the added or deleted mobile network nodes.

6. The mobile node according to claim 4, comprising:

if a new mobile network node is added within the local network managed by the mobile node, and the mobile network node requests an assignment of an address, means for acquiring a new subsidiary home address from the home agent, and assigning the new subsidiary home address to the mobile network node; and if the mobile network node is deleted from within the local network managed by the mobile node, and the mobile network node notifies returning the subsidiary home address, means for returning the subsidiary home address to the home agent, whereby the number of the subsidiary home addresses owned by the mobile node is dynamically increased or decreased according to the added or deleted mobile network nodes.

7. A non-transitory computer readable recording medium comprising a control program for a mobile node in a mobile communication system composed of a home agent, the mobile node, and one or more correspondent nodes, wherein said control program allows said mobile node to function as means for storing a preassigned representative home address, one or more preassigned subsidiary home addresses, and a care-of address temporarily assigned in a network in which the mobile node is currently present;

as means for making a registration request for joint information which relates the representative home address to all subsidiary home addresses and the care-of address to the home agent, each time the mobile node moves to other network, and is assigned a new care-of address; and wherein said control program allows said mobile node to function as means for assigning any subsidiary home address to a plurality of mobile network nodes under said mobile node, and if a packet destined for the subsidiary home address assigned to the mobile network nodes arrives, transferring this to the corresponding mobile network node.

8. The non-transitory computer readable recording medium comprising a control program for the mobile node according to claim 7, wherein if a new mobile network node is added within a local network, and the mobile network node requests an assignment of an address, said control program allows said mobile node to function as means for assigning any unregistered subsidiary home address to the mobile network node, and requesting additional registration of this subsidiary home address to the home agent, and if the mobile network node is deleted from within the local network, and the mobile network node notifies returning the subsidiary home address, as means for requesting deregistration of this subsidiary home address to the home agent.

9. The non-transitory computer readable recording medium comprising a control program for the mobile node according to claim 7, wherein, if a new mobile network node is added within a local network managed by the mobile node, and the mobile network node requests an assignment of an address, said control program allows said mobile node to function as means for acquiring a new subsidiary home address from the home agent, and assigning this to the mobile network node; and if the mobile network node is deleted from within the local network managed by said mobile node, and the mobile network node notifies returning the subsidiary home address, as means for returning the subsidiary home address to the home agent.

* * * * *